United States Patent
Downie et al.

(10) Patent No.: US 11,081,737 B2
(45) Date of Patent: Aug. 3, 2021

(54) GETTER FOR USE WITH ELECTROCHEMICAL CELLS, DEVICES INCLUDING THE GETTER, AND METHOD OF FORMING SAME

(71) Applicant: Viking Power Systems Pte. Ltd., Singapore (SG)

(72) Inventors: Craig Downie, Waltham, MA (US); Robert Ellis Doe, Medfield, MA (US); David Eaglesham, Lexington, MA (US)

(73) Assignee: Viking Power Systems Pte, Ltd., Singapore (SG)

( * ) Notice: Subject to any disclaimer, the term of this patent is extended or adjusted under 35 U.S.C. 154(b) by 0 days.

(21) Appl. No.: 16/049,550

(22) Filed: Jul. 30, 2018

(65) Prior Publication Data
US 2019/0036180 A1    Jan. 31, 2019

Related U.S. Application Data

(60) Provisional application No. 62/539,393, filed on Jul. 31, 2017.

(51) Int. Cl.
| | |
|---|---|
| *H01M 10/052* | (2010.01) |
| *H01M 10/52* | (2006.01) |
| *H01M 10/0525* | (2010.01) |
| *H01M 10/058* | (2010.01) |
| *H01M 10/0567* | (2010.01) |
| *H01M 4/62* | (2006.01) |
| *H01M 4/36* | (2006.01) |
| *H01M 4/13* | (2010.01) |
| *H01M 50/449* | (2021.01) |
| *C01D 15/02* | (2006.01) |
| *H01M 10/0568* | (2010.01) |
| *H01M 10/0569* | (2010.01) |

(52) U.S. Cl.
CPC ............ *H01M 10/52* (2013.01); *C01D 15/02* (2013.01); *H01M 4/13* (2013.01); *H01M 4/366* (2013.01); *H01M 4/62* (2013.01); *H01M 10/052* (2013.01); *H01M 10/058* (2013.01); *H01M 10/0525* (2013.01); *H01M 10/0567* (2013.01); *H01M 50/449* (2021.01); *H01M 10/0568* (2013.01); *H01M 10/0569* (2013.01); *H01M 2300/0037* (2013.01)

(58) Field of Classification Search
CPC ......... H01M 10/0568; H01M 10/0569; H01M 4/38; H01M 4/583; H01M 6/16; H01M 10/052; H01M 10/0525; H01M 10/056; H01M 10/52; H01M 4/13
See application file for complete search history.

(56) References Cited

U.S. PATENT DOCUMENTS

| | | | |
|---|---|---|---|
| 4,448,860 A | 5/1984 | von Alpen et al. | |
| 6,168,884 B1 | 1/2001 | Neudecker et al. | |
| 6,258,478 B1 | 7/2001 | Kim | |
| 6,402,795 B1 | 6/2002 | Chu et al. | |
| 6,573,002 B1* | 6/2003 | Jungnitz | H01M 6/16 |
| | | | 429/189 |
| 6,706,447 B2 | 3/2004 | Gao et al. | |
| 7,776,465 B1 | 8/2010 | Hatazawa et al. | |
| 7,883,797 B2 | 2/2011 | Kishi et al. | |
| 8,460,808 B2 | 6/2013 | Toia et al. | |
| 8,715,865 B2 | 5/2014 | Xu et al. | |
| 8,834,180 B2 | 9/2014 | Woo et al. | |
| 8,865,350 B2 | 10/2014 | Yamada et al. | |
| 9,114,382 B2 | 8/2015 | Visconti et al. | |
| 9,887,415 B2 | 2/2018 | Fischer et al. | |
| 2003/0049519 A1* | 3/2003 | Ishida | H01M 4/13 |
| | | | 429/57 |
| 2007/0231707 A1 | 10/2007 | Abe et al. | |
| 2009/0035662 A1 | 2/2009 | Scott et al. | |
| 2010/0173192 A1 | 7/2010 | Toia et al. | |
| 2013/0059178 A1 | 3/2013 | Ihara et al. | |
| 2013/0171514 A1 | 7/2013 | Mio et al. | |
| 2016/0006081 A1 | 1/2016 | Eaglesham et al. | |
| 2016/0043429 A1* | 2/2016 | Hatta | B60L 58/10 |
| | | | 429/302 |
| 2016/0141718 A1* | 5/2016 | Ye | H01M 4/583 |
| | | | 429/199 |
| 2016/0172660 A1 | 6/2016 | Fischer et al. | |
| 2016/0172661 A1 | 6/2016 | Fischer et al. | |
| 2016/0197376 A1 | 7/2016 | Koshiba et al. | |
| 2016/0261000 A1 | 9/2016 | Zhang et al. | |
| 2016/0344063 A1 | 11/2016 | Chang et al. | |
| 2017/0033406 A1 | 2/2017 | Zhang et al. | |
| 2018/0102531 A1 | 4/2018 | Fischer et al. | |
| 2018/0102532 A1 | 4/2018 | Fischer et al. | |
| 2019/0036179 A1 | 1/2019 | Downie et al. | |

FOREIGN PATENT DOCUMENTS

WO       2015033619       12/2015

OTHER PUBLICATIONS

USPTO; Non-Final Office Action dated Mar. 29, 2017 in U.S. Appl. No. 14/966,100.
USPTO; Final Office Action dated Jul. 20, 2017 in U.S. Appl. No. 14/966,100.
USPTO; Notice of Allowance dated Oct. 19, 2017 in U.S. Appl. No. 14/966,100.
PCT; International Search Report and Written Opinion dated Nov. 26, 2018 in Application No. PCT/US2018/044429.
PCT; International Search Report dated Mar. 18, 2019 in Application No. PCT/US2018/066557.
PCT; Written Opinion dated Mar. 18, 2019 in Application No. PCT/US2018/066557.
Aurbach et al., "Prototype Systems for Rechargeable Magnesium Batteries," Nature, vol. 407(6805), pp. 724-727, (2000).

(Continued)

*Primary Examiner* — Haidung D Nguyen
(74) *Attorney, Agent, or Firm* — Downs Rachlin Martin PLLC

(57) ABSTRACT

An electrochemical cell including a getter material, a battery including the electrochemical cell, and methods of forming the electrochemical cell and battery are disclosed.

20 Claims, 7 Drawing Sheets

(56) References Cited

OTHER PUBLICATIONS

Aurbach et al., "Nonaqueous Magnesium Electrochemistry and its Application in Secondary Batteries," The Chemical Record, vol. 3, pp. 61-73, (2003).
Brandt, "Historical Development of Secondary Lithium Batteries," Solid State Ionics, vol. 69(3-4), pp. 173-183, (1994).
Chalasani et al., "Methylene Ethylene Carbonate: Novel Additive to Improve the High Temperature Performance of Lithium Ion Batteries," Journal of Power of Sources, vol. 208, pp. 67-73, (2012).
Dahn, "Electrically Rechargeable Metal-Air Batteries Compared to Advanced Lithium-Ion Batteries," presented at IBM Almadan Institute, (2009).
Harry et al., "Detection of Subsurface Structures Underneath Dendrites Formed on Cycled Lithium Metal Electrodes," Nature Materials, vol. 13, pp. 69-73, (2014).
Gallagher et al., "Manufacturing Costs of Batteries for Electric Vehicles," Lithium-Ion Batteries: Advances and Applications, Chapter 6, pp. 97-126, (2014).
Li et al., "A Review of Lithium Deposition in Lithium-Ion and Lithium Metal Secondary. Batteries," Journal of Power of Sources, vol. 254, pp. 168-182, (2014).
Liu et al., "Rechargeable Mg-Ion Batteries Based on WSe2 Nanowire Cathodes," ACS Nano, vol. 7(9), pp. 8051-8058, (2013).
Matsui, "Study on Electrochemically Deposited Mg Metal," Journal of Power Sources, vol. 196(16), pp. 7048-7055, (2011).
Mikhaylik, "Protection of Li Anodes Using Dual Phase Electrolytes," Sion Power, DoE EERE Report, 8 Pages, (2011).
Nguyen et al., "Improved Cycling Performance of Si Nanoparticle Anodes via Incorporation of Methylene Ethylene Carbonate," Electrochemistry Communications, vol. 66, pp. 71-74, (2016).
Park et al., "A Highly Reversible Lithium Metal Anode," Nature Scientific Reports, vol. 4, Report No. 3815, 8 Pages, (2014).
Von Sacken et al., "Comparative Thermal Stability of Carbon Intercalation Anodes and Lithium Metal Anodes for Rechargeable Lithium Batteries," Journal of Power Sources, vol. 54(2), pp. 240-245, (1995).
Vaughey et al., "Lithium Metal Anodes," Annual Merit Review, DOE Vehicle Technologies Program, 31 Pages, (2009).
Zheng et al., "Magnesium Cobalt Silicate Materials for Reversible Magnesium Ion Storage," Electrochimica Acta, vol. 66, pp. 75-81, (2012).
Non-Final Office Action dated Nov. 24, 2020, issued in connection with U.S. Appl. No. 16/049,535, filed Jul. 30, 2018.

\* cited by examiner

GETTER FOR USE WITH ELECTROCHEMICAL CELLS, DEVICES INCLUDING THE GETTER, AND METHOD OF FORMING SAME

CROSS-REFERENCE TO RELATED APPLICATION

The present disclosure claims the benefit of U.S. Provisional Patent Application No. 62/539,393, filed on Jul. 31, 2017 and entitled "ELECTROCHEMICAL CELL WITH GETTER AND METHOD OF FORMING SAME," which is incorporated herein by reference.

FIELD OF INVENTION

The disclosure generally relates to electrochemical cells. More particularly, exemplary embodiments of the present disclosure relate to electrochemical cells including a getter.

BACKGROUND OF THE DISCLOSURE

Electrochemical cells, such as rechargeable or secondary electrochemical cells, can be used to power a variety of devices, such as mobile phones, portable computers, other portable devices, electric or hybrid cars, as well as many other appliances. For many applications, it is desirous to use electrochemical cells with relatively high energy density (energy that can be derived from a cell per unit volume of the cell), relatively high specific energy density (energy that can be derived per unit weight of the cell or per unit weight of the active electrode material), and/or relatively high average discharge potential of the cell, so that desired energy can be supplied to a device using the cell, while minimizing the mass and/or volume of the cell.

Generally, electrochemical cells include an anode, a cathode, a separator between the anode and cathode, and an electrolyte. During discharge of an electrochemical cell, an oxidation-reduction reaction occurs, causing electrons flow, through an external circuit, from the anode to the cathode, and cations are attracted from the anode to the cathode. In the case of secondary electrochemical cells, the cells can be recharged by causing electrons and cations to flow in the opposite direction using a charger.

During discharging and/or charging of electrochemical cells, particularly of high-energy electrochemical cells (e.g., electrochemical cells with an average discharge potential of 3.5 Volts or more), undesired reactions of one or more components within an electrochemical cell (e.g., between one or more components of the electrolyte and/or between one or more components within an electrolyte and one or more components of an anode and/or a cathode) can occur, resulting in undesired gas production within the cell. For example, one or more of electrolyte components can oxidize or otherwise degrade to form unwanted gas. The produced gas can cause an increase in the cell volume, thereby reducing the energy density of the cell, can cause a reduction of the capacity of the electrochemical cell, can deleteriously affect other discharge performance of the cell, and/or can be a safety hazard.

Various attempts to capture gas that is produced in electrochemical cells have been developed. For example, getter material that is sealed apart from the electrochemical cell has been used to capture gas, such as carbon dioxide formed within an electrochemical cell. Unfortunately, placing a seal between the getter material and the electrochemical cell can add undesired weight and/or volume to the electrochemical cell and can prevent the getter material from addressing gas production during regular charging and discharging of the electrochemical cell.

U.S. Pat. No. 4,448,860, in the name of von Alpen et al., discloses a cell that is protected against the danger of corrosion of the alkali metal electrode, particularly due to moisture penetrating from the outside the cell, by providing the cell with a gas-absorbing getter material. The gas-absorbing getter material is designed to mitigate danger associated with in-flowing ambient oxygen, $CO_2$, or inwardly diffusing water. The reference does not disclose techniques for addressing gasses that form as a result of high-energy cell operation.

U.S. Pat. No. 7,776,465, in the name of Hatazawa et al., discloses a battery that includes an outer covering member that includes a laminated film and battery element (electrochemical cell) contained within the outer covering member and sealed therein. The outer covering member includes a gas absorbable material interposed between the outermost layer of the outer covering member and the battery element. In other words, the gas-absorbable material is not part of the electrochemical cell, but rather is separated from the electrochemical cell and included in an outer covering member.

U.S. Pat. No. 8,460,808, in the name of Toia et al., discloses a rechargeable battery that includes means for sorbing harmful substances. The means includes a polymeric housing that is permeable to said harmful substances but impermeable to the electrolyte. One or more getter materials for the sorption of said harmful substances are included within the polymeric housing.

U.S. Pat. No. 8,834,180, in the name of Woo et al., discloses a secondary battery that includes an electrode assembly, a gas-collecting member, and a battery case. The electrode assembly includes first and second electrode plates and a separator interposed between the first and second electrode plates. The gas-collecting member is provided separately and adjacent to the electrode assembly. The battery case encases the electrode assembly and the gas-collecting member.

U.S. Pat. No. 9,114,382, in the name of Visconti et al., discloses a carbon dioxide composite getter that includes an envelope that is permeable to $CO_2$ and powders of a first and a second active material contained within the envelope. The first active material is lithium hydroxide and the second active material is lithium oxide. The getter is separate from the electrochemical cell, and thus adds significant volume to a battery.

Each of the above-described electrochemical cells suffers various drawbacks. Accordingly, improved electrochemical cells including getter material, batteries including the electrochemical cells, and methods of forming the same are desired.

SUMMARY OF THE DISCLOSURE

Various embodiments of the present disclosure provide improved electrochemical cells including getter material, including one or more gas getters, in direct contact with one or more components of the electrochemical cells—i.e., the getter material or getters are not contained in a separate envelope or container. This allows the getter(s) to work efficiently, without adding significant weight or volume to the cells or batteries including the cells. Use of getters in direct contact with one or more components of the electrochemical cell can also efficiently capture gas that forms within the cell (e.g., within an electrolyte of the cell) during use and/or facilitate high voltage operation of the cells.

In accordance with at least one exemplary embodiment of the disclosure, an electrochemical cell, such as a secondary or rechargeable electrochemical cell, includes a first electrode, a second electrode, a separator between the first electrode and the second electrode, a non-aqueous electrolyte, and a getter material comprising one or more gas getters (also referred to herein simply as getter or getters), wherein the one or more gas getters are in direct contact with, form part of, or both one or more of the first electrode, the second electrode, the separator, and the non-aqueous electrolyte. In accordance with various aspects of these embodiments, the non-aqueous electrolyte comprises a salt that does not readily hydrolyze. In accordance with some aspects of these embodiments, the one or more salts do not comprise an anion selected from the group consisting of $PF_6^{-1}$, $BF_4^{-1}$, $AlCl_4^{-1}$, $AsF_6^{-1}$, $ClO_4^{-1}$, $SiF_6^{-1}$, or $SbF_6^{-1}$. Exemplary salts suitable for use in exemplary electrolytes comprise at least three elements and include two or more of the following: boron, phosphorous, fluorine, carbon, nitrogen, sulfur, and oxygen. Non-limiting examples of exemplary salts of the disclosure include use of one or more salts comprise one or more anions selected from the group consisting of triflate ($CF_3SO_3^{-1}$), triflinate ($CF_3SO_2^{-1}$), perfluorobutanesulfonate ($C_4F_9SO_3^{-1}$), bis(perfluoroalkylsulfonyl)imide $[N((C_xF_{2x+1})_xSO_2)_2^{-1}]$ bis(trifluoromethane)sulfonimide $[N(CF_3SO_2)_2^{-1}]$, bis(perfluoroethylsulfonyl)imide $[N(C_2F_5SO_2)_2^{-1}]$, bis(fluorosulfonyl)imide $[N(SO_2F)_2^{-1}]$, bis(perfluoropinacolato)borate $[B(C_6F_{12}O_2)_2^{-1}]$, bis(oxalato)borate $[B(C_2O_4)_2^{-1}]$, difluoro(oxalato)borate $[BF_2(C_2O_4)^{-1}]$, difluoro(malonato)borate $[BF_2(C_3H_2O_4)^{-1}]$, bis(benzenesulfonyl)imide $[N(C_6H_5SO_2)_2^{-1}]$, and bis(salicylato)borate $[B(C_7H_4O_3)_2^{-1}]$. The one or more salts include a cation, such as lithium. In accordance with further aspects, the electrochemical cell is a high-energy rechargeable electrochemical cell with having an average discharge potential of ≥3.5 V, ≥4 V, ≥4.25 V, or ≥4.5 V. In accordance with further aspects, the electrochemical cell is a high-energy rechargeable electrochemical cell having an upper charge cutoff potential of ≥4.3 V, ≥4.35 V, ≥4.4 V, or ≥4.45 V. The electrolyte can be a fluid, such as a liquid or a gel, which may also be in contact with solid ion conductors at least incorporated into the cell electrolyte in part (e.g., polymer, glass, ceramic). The first electrode can include Li, Li alloys such as Si, Sn, Bi, Al, $Li_4Ti_5O_{12}$, hard carbon, graphitic carbon, and amorphous carbon. The second electrode can include second electrode active material, such as transition metal oxides, transition metal oxo-anions, chalcogenides, halogenides and combinations thereof. Non-limiting examples of transition metal oxides comprised of one or more transition metals and one or more redox active transition metals such as Lithium Cobalt Oxide, Lithium Nickel Manganese Cobalt Oxide, and Lithium Nickel Cobalt Aluminum Oxide compositions. Non-limiting examples of positive electrode active materials for the Li battery include Lithium metal phosphates and tavorites such as $LiFePO_4$, Lithium metal oxide spinels $LiMn_2O_4$, and Li NASICON's $Li_3V_2(PO_4)_3$. The separator can include, for example, porous polypropylene, porous polyethylene, aramid fiber, or glass fiber. The one or more gas getters can include at least one of a metal oxide and a metal hydroxide, such as one or more compounds selected from the group consisting of: LiOH, $Li_2O$, NaOH, $Na_2O$, KOH, $K_2O$, $Mg(OH)_2$, MgO, $Ca(OH)_2$, and CaO in any combination. The getter material can further include one or more of carbon, polymer, resin, metal, or ceramic in any combination. In accordance with exemplary aspects, the getter material does not include any of a silica gel, an alumina, or a zeolite. The getter material can be included as part of a coating that is applied to one or more of the first electrode, the second electrode, and the separator. Additionally or alternatively, the getter material can be incorporated into one or more of the first electrode, the second electrode, the separator, and the electrolyte.

In accordance with further exemplary embodiments, a composite getter includes one or more gas getters or gas getter materials (e.g., as described herein) dispersed in a non-aqueous fluid. The gas getter(s) and/or getter material(s) can be dispersed in a non-aqueous fluid as a mixture, suspension, or colloid. The non-aqueous fluid can include one or more (e.g., lithium) salts that do not readily hydrolyze or dissolve in the one or more non-aqueous solvents. In accordance with some aspects of these embodiments, the one or more salts do not comprise an anion selected from the group consisting of $PF_6^{-1}$, $BF_4^{-1}$, $AlCl_4^{-1}$, $AsF_6^{-1}$, $ClO_4^{-1}$, $SiF_6^{-1}$, or $SbF_6^{-1}$. For example, the one or more salt may not include the one or more salts do not comprise any of $LiPF_6$, $LiBF_4$, $LiAlCl_4$, $LiAsF_6$, $LiClO_4$, $LiSiF_6$, or $LiSbF_6$. In accordance with further aspects, the non-aqueous fluid comprises one or more salts of at least one of the following anions: triflate ($CF_3SO_3^{-1}$), triflinate ($CF_3SO_2^{-1}$), perfluorobutanesulfonate ($C_4F_9SO_3^{-1}$), bis(perfluoroalkylsulfonyl)imide $[N((C_xF_{2x+1})_xSO_2)_2^{-1}]$, bis(trifluoromethane)sulfonimide $[N(CF_3SO_2)_2^{-1}]$, bis(perfluoroethylsulfonyl)imide $[N(C_2F_5SO_2)_2^{-1}]$, bis(fluorosulfonyl)imide $[N(SO_2F)_2^{-1}]$, bis(perfluoropinacolato)borate $[B(C_6F_{12}O_2)_2^{-1}]$, bis(oxalato)borate $[B(C_2O_4)_2^{-1}]$, difluoro(oxalato)borate $[BF_2(C_2O_4)^{-1}]$, difluoro(malonato)borate $[BF_2(C_3H_2O_4)^{-1}]$, bis(benzenesulfonyl)imide $[N(C_6H_5SO_2)_2^{-1}]$, and bis(salicylato)borate $[B(C_7H_4O_3)_2^{-1}]$. In accordance with additional exemplary aspects, the one or more salts comprise at least three elements and include two or more of the following: boron, phosphorous, fluorine, carbon, nitrogen, sulfur, and oxygen. The non-aqueous fluid can include at least one solvent that is a non-aqueous polar aprotic solvent. In accordance with further aspects, the non-aqueous fluid comprises at least one solvent including: ethers, organic carbonates, tertiary amines, lactones, ketones, glymes, nitriles, ionic liquids, aliphatic and aromatic hydrocarbon solvents, and organic nitro solvents. By way of examples, the non-aqueous fluid comprises at least one solvent including THF, 2-methyl THF, dimethoxyethane, diglyme, triglyme, tetraglyme, diethoxyethane, diethylether, proglyme, ethyl diglyme, butyl diglyme, fluorinated ether, hydrofluoroethers, ethylene carbonate, fluoro-ethylene carbonate, dimethyl carbonate, ethyl methyl carbonate, diethyl carbonate, dimethylsulfoxide, dimethylsulfite, sulfolane, ethyl methyl sulfone, acetonitrile, hexane, toluene, fluoro-toluene, nitromethane, 1-3 dioxalane, 1-3 dioxane, 1-4 dioxane, trimethyl phosphate, tri-ethyl phosphate, hexa-methyl-phosphoramide (HMPA), N,N-propyl-methyl-pyrrolidinium-bis(trifluoromethylsulfonyl)imide (P13-TFSI), N,N-propyl-methyl-pyrrolidinium-diacetamide (P13-DCA), propyl-methyl-pyrrolidinium-bis(fluorosulfonyl)imide (P13-FSI), ethyl-dimethyl-propyl-ammonium-bis(trifluoromethylsulfonyl)imide (PDEA-TFSI), and 1-(methoxyethyl)-1-methylpiperidinium-bis(trifluoromethylsulfonyl)imide (MOEMPP-TFSI). A concentration of the salt, or a combination of the one or more salts in the non-aqueous fluid ranges from, for example, about 0.01 M to about 10 M. The composite getter can be incorporated into one or more components of an electrochemical device, such as the electrochemical cells, and batteries described herein. For example, the composite getter can be or be incorporated into a coating that is applied to one or more of electrodes, packaging material, and the insulating separator of the electrochemical cell. The electrochemical cell or device can be configured to charge to, for example, greater than or equal to 4.0 V or other voltages described herein.

In accordance with further exemplary embodiments of the disclosure, a battery incudes one or more electrochemical cells as described herein. The batteries can additionally include a casing and/or one or more leads. Exemplary batteries can be in the form of coin battery, a soft pack cell laminate, a cylindrical cell, or the like.

In accordance with additional exemplary embodiments of the disclosure, a method of forming an electrochemical cell includes the steps of forming a structure comprising a first electrode, a second electrode, and a separator between the first and second electrodes, and providing a getter material in direct contact with one or more of the first electrode, the second electrode, and the separator, and the electrolyte. For example, the method can include introducing a mixture, solution, colloid, or suspension of getter material and a liquid to the structure, wherein the getter material directly contacts one or more of the first electrode, the second electrode, and the separator, removing at least a portion of the liquid, and after removing at least a portion of the liquid, adding an electrolyte solution to the structure. A battery can be formed by adding a casing around the electrochemical cell. Non-limiting examples of the liquid employed to introduce the getter material as a mixture, solution, colloid, or suspension include water, alcohol, ester, ketone, ether, lactam, amide, nitrile, methanol, ethanol, isopropanol, carbonate, ethyl methyl carbonate, dimethyl carbonate, tetrahydrofuran, 1,2-dimethoxy ethane, acetone, N-methyl-2-pyrrolidone, and acetonitrile.

Both the foregoing summary and the following detailed description are exemplary and explanatory only and are not restrictive of the disclosure or the claimed invention.

BRIEF DESCRIPTION OF THE DRAWING FIGURES

A more complete understanding of the embodiments of the present disclosure may be derived by referring to the detailed description and claims when considered in connection with the following illustrative figures.

Figure 1:
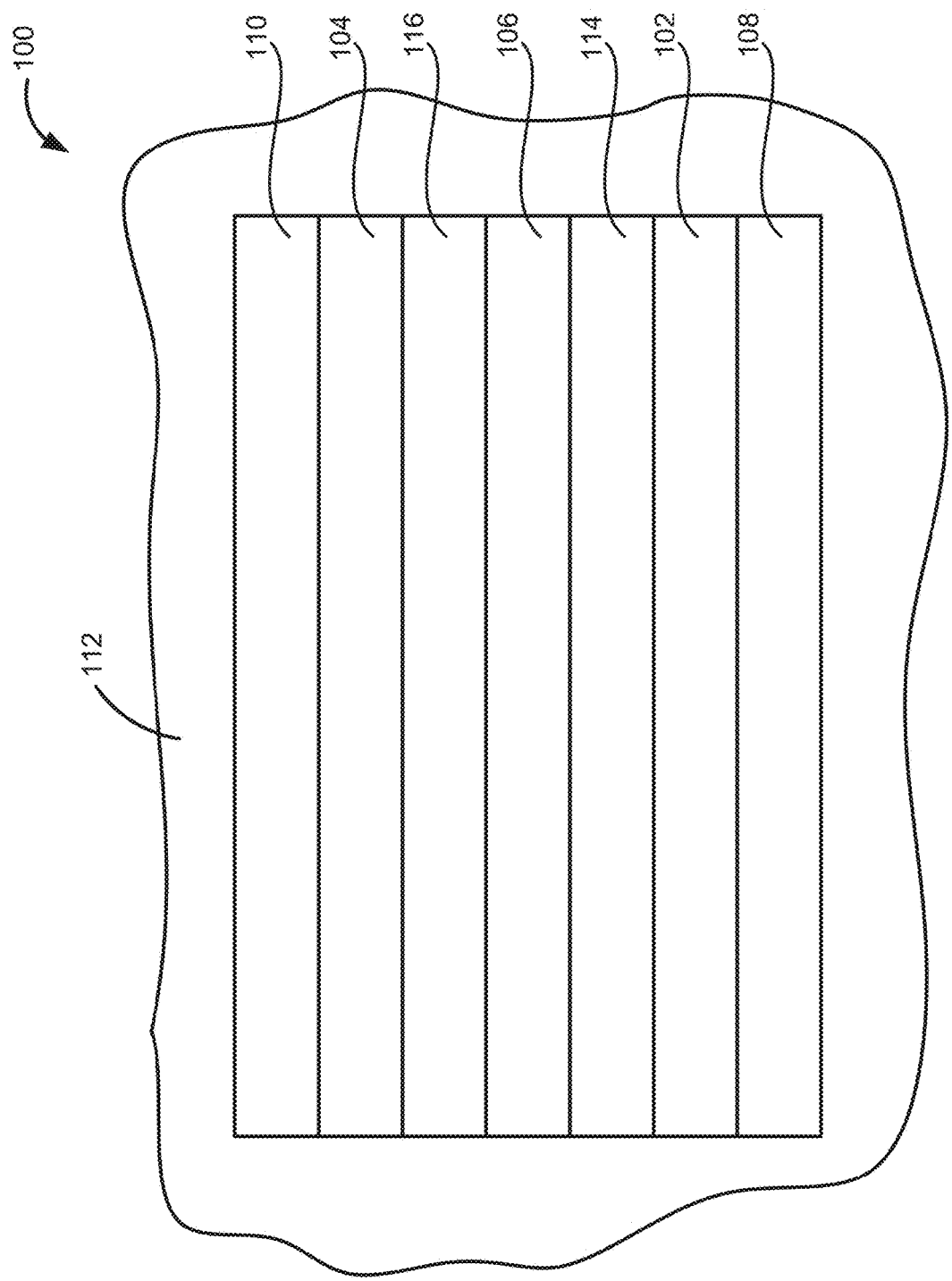
FIG. 1 illustrates an electrochemical cell in accordance with at least one exemplary embodiment of the disclosure.

It will be appreciated that elements in the figures are illustrated for simplicity and clarity and have not necessarily been drawn to scale. For example, the dimensions of some of the elements in the figures may be exaggerated relative to other elements to help to improve understanding of illustrated embodiments of the present disclosure.

DETAILED DESCRIPTION OF EXEMPLARY EMBODIMENTS OF THE INVENTION

The description of exemplary embodiments of electrochemical cells, batteries, and methods provided below is merely exemplary and is intended for purposes of illustration only; the following description is not intended to limit the scope of the disclosure or the claims. Moreover, recitation of multiple embodiments having stated features is not intended to exclude other embodiments having additional features or other embodiments incorporating different combinations of the stated features.

Additionally, in this disclosure, any ranges indicated may include or exclude the endpoints. Any values of variables indicated (regardless of whether they are indicated with "about" or not) may refer to precise values or approximate values and include equivalents, and may refer to average, median, representative, majority, or a single value.

As set forth in more detail below, various embodiments of the specification relate to electrochemical cells that include a getter or getter material in direct contact with or that forms part of one or more components of an electrochemical cell that can form part of a battery. Exemplary electrochemical cells described herein maintain a relatively high energy density, specific energy, and/or can operate at relatively high energy levels (e.g., average discharge voltages of $\geq 3.5$ V, $\geq 4$ V, $\geq 4.25$ V, or $\geq 4.5$ V). In accordance with further aspects, the electrochemical cell is a high-energy rechargeable electrochemical cell having an upper charge cutoff potential of $\geq 4.3$ V, $\geq 4.35$ V, 4.4 V, or $\geq 4.45$ V. Further, exemplary electrochemical cells are relatively safe, because the getter captures an amount of gas that is produced within a battery and therefore reduces a likelihood of battery rupture. Examples of this disclosure can be used to form a variety of types of electrochemical cells. For illustration purposes, specific embodiments are described herein in the context of rechargeable, or secondary, lithium-based electrochemical cells such as lithium-ion electrochemical cells and rechargeable lithium metal cells, and those that combine attributes of both. However, the disclosure is not limited to such examples, unless otherwise noted.

Lithium-ion cells generally contain active materials that operate on the principle of intercalation wherein Li+ ions migrate in and out of host structures (e.g., graphitic negative electrodes and layered transition metal oxide positive electrode materials) without breaking and forming chemical bonds. Hence there is relatively little structural change (e.g., $\leq 5\%$ volume expansion) within the electrode materials, and therefore the cell. Generally, this provides a high degree of reversibility for the electrochemical reactions in the cell, with minimal reaction surface area; however it also limits the energy density of the electrode, and therefore the cell. It is generally accepted that significant improvement in energy density will employ higher voltage materials (e.g., coated $LiCoO_2$, High Ni "NMC"), or migration away from pure intercalation reaction to those reactions using the breaking and forming of chemical bonds, because the latter reactions allow for denser storage of Li-ions than do intercalation hosts. Among these are conversion, or displacement reactions, alloying reactions, and metal deposition. That said, dense storage of Li-ions coincides with relatively large structural change and surface area exposure (e.g., ≥5% volume expansion) within the electrode materials and therefore the cell. That is, the migration towards higher energy cell chemistry generally follows two paths: higher voltage and higher surface area reactions to allow for denser storage of Li. A high degree of repeated and uncontrolled surface area change and/or high voltage can facilitate a greater degree of parasitic chemical reactions, resulting in deterioration of the cell, cycle life, power density, and margin for safe operation—thus offsetting gains in energy density. Furthermore, such parasitic reactions can results in formation of gaseous products due to parasitic reactions between electrolyte components and/or between electrolyte components and electrode surfaces. Electrochemical cells including a getter in contact with or that forms part of one or more of the electrochemical cell components can address these issues.

FIG. 1 illustrates an electrochemical cell 100 in accordance with exemplary embodiments of the disclosure. Electrochemical cell 100 includes a first electrode 102, a second electrode 104, a separator 106 interposed between first electrode 102 and second electrode 104, a fluid electrolyte 112 in contact with first and second electrodes 102, 104, and optionally includes one or more layers (e.g., coatings) 114, 116, including getter material. As described in more detail below, electrochemical cell 100 can additionally or alternatively include getter material incorporated into one or more of first electrode 102, second electrode 104, separator 106, and/or electrolyte 112. Although electrochemical cell 100 is illustrated with two layers 114, 116 including getter material, as described in more detail below, electrochemical cells in accordance with the disclosure can include additional getter material layers, only one of layers 114, 116, or may not include either of layers 114, 116. In the illustrated example, electrochemical cell 100 also includes a first current collector 108 in electrical contact with first electrode 102 and a second current collector 110 in contact with the second electrode.

First electrode 102 (also sometimes referred to herein as a negative electrode or anode) comprises a negative electrode active material that can accept cations. Non-limiting examples of negative electrode active material for lithium-based electrochemical cells include Li, Li alloys such as Si, Sn, Bi, and/or Al alloys, $Li_4Ti_5O_{12}$, hard carbon, graphitic carbon, and/or amorphous carbon. Non-limiting examples of negative electrode active material for other rechargeable electrochemical cells include, Mg, Na, Ca, and alloys thereof, hard carbon, graphitic carbon, and/or amorphous carbon. In accordance with some embodiments of the disclosure, most (e.g., greater than 90 wt % to all) of the anode active material can be initially included in a discharged second electrode 104 (also sometimes referred to herein as a positive electrode or cathode) when electrochemical cell 100 is initially made, so that the electrode active material forms part of first electrode 102 during a first charge of electrochemical cell 100—thus providing for a rechargeable electrochemical cell wherein N/P ratio<4. That is, a rechargeable cell wherein the capacity of the first electrode 102, N, and the capacity of the second electrode 104, P, are configured such that N/P is <4. A technique for depositing electroactive material on a portion of first electrode 102 or first current collector 108 using this technique is described in U.S. Patent Publication No. 2016/0172660, in the name of Fischer et al., and similarly in U.S. Patent Publication No. 2016/0172661, in the name of Fischer et al., the contents of which are hereby incorporated herein by reference, to the extent such contents do not conflict with the present disclosure.

First electrode 102 and second electrode 104 can further include one or more electronically conductive additives. Non-limiting examples of electronically conductive additives include carbon black, Super P®, C-NERGY™ Super C65, Ensaco® black, Ketjenblack®, acetylene black, synthetic graphite such as Timrex® SFG-6, Timrex® SFG-15, Timrex® SFG-44, Timrex® KS-6, Timrex® KS-15, Timrex® KS-44, natural flake graphite, carbon nanotubes, fullerenes, hard carbon, or mesocarbon microbeads. First electrode 102 can include any combination of the one or more electronically conductive additives.

In accordance with some embodiments of the disclosure, first electrode 102 and/or second electrode 104 further includes one or more polymer binders. Non-limiting examples of polymer binders include poly-vinylidene fluoride (PVdF), poly(vinylidene fluoride-co-hexafluoropropene) (PVdF-HFP), Polytetrafluoroethylene (PTFE), Kynar Flex® 2801, Kynar® Powerflex LBG, and Kynar® HSV 900, and Teflon®. First electrode 102 and/or second electrode 104 can include any combination of the one or more polymer binders.

In accordance with further exemplary embodiments, first electrode 102 is configured to provide >1000 mAh/cc. Non-limiting exemplary techniques for forming such electrodes are described in U.S. Patent Publication No. 2016/0172661.

First electrode 102 can optionally include getter material, which includes one or more gas getters. The one or more gas getters can comprise one or more compounds selected from the group consisting of metal oxides and metal hydroxides. In these cases, a molar ratio of the metal oxides: metal hydroxides can depend on desired characteristics of the getters. For example, the getter material can include more metal hydroxide(s) to increase a speed of gas absorption or more metal oxide(s) to increase a capacity to capture gas. Exemplary getters include compounds selected from the group consisting of: LiOH, $Li_2O$, NaOH, $Na_2O$, KOH, $K_2O$, $Mg(OH)_2$, MgO, $Ca(OH)_2$, and CaO, which can be combined in any combination, or be one compound from the group. Exemplary molar ratios of metal oxide(s) to metal hydroxide(s) range from about 0 to about 1, about 0.5 to about 0.5, or about 1 to about 0.

In addition to one or more getters, getter material can include one or more of carbon, polymer, resin, metal, or ceramic, in any combination. Such additional material(s) can be used to, for example, facilitate incorporation of the getter into one or more components of an electrochemical cell (e.g., electrode, separator, or electrolyte) or coat getter material onto the one or more of the components. In accordance with further exemplary embodiments of this disclosure, getter material does not comprise any of a silica gel, an alumina, or a zeolite. An amount of the one or more gas getter can be a molar ratio equivalent (about more—e.g., about two, five, or ten percent more) to the mols of gas (e.g., $CO_2$, CO, $H_2S$, $NO_2$, $SO_2$, $H_2O$, $H_2$, $O_2$, $C_2H_4$, $C_3H_6$, $C_xH_{4*x}$, hydrocarbons) expected to be produced during charging and/or discharging of electrochemical cell 100.

Second electrode 104 (as noted above, also sometimes referred to herein as a positive electrode or cathode) can include intercalation material. Exemplary intercalation materials include transition metal oxides, transition metal oxo-anions, chalcogenides, halogenides and combinations thereof. Non-limiting examples of positive electrode active materials for the lithium electrochemical cells include lithium transition metal oxides comprised of one or more transition metals and one or more redox active transition metals such as lithium cobalt oxide, lithium nickel manganese cobalt oxide compositions, lithium nickel cobalt aluminum compositions, and lithium metal phosphates and tavorites such as LiFePO4, lithium metal oxide spinels LiMn$_2$O$_4$, and Li NASICON's Li$_3$V$_2$(PO$_4$)$_3$. By way of examples lithium nickel manganese cobalt oxide "NMC" can include a variety of transition metal ratios and lithium excess. Exemplary NMC ratios include, but are not limited to, Li[Ni$_{1/3}$Mn$_{1/3}$Co$_{1/3}$]O$_2$ or so-called "111", Li[Ni$_{5/3}$Mn$_{3/3}$Co$_{2/3}$]O$_2$ or so-called "532", Li[Ni$_{6/3}$Mn$_{2/3}$Co$_{2/3}$]O$_2$ or so-called "622", Li[Ni$_{8/3}$Mn$_{1/3}$Co$_{1/3}$]O$_2$ or so-called "811" either with stoichiometric or excess lithium to transition metals. In addition, second electrode 104 may comprise conversion, or displacement, reaction materials. Non-limiting examples of conversion, or displacement reaction materials includes sulfur, metal nitrides, metal phosphides, metal sulfides, metal oxides, metal fluorides, metal chlorides such as FeF$_3$, FeF$_2$, NiF$_2$, Co$_3$O$_4$, ZnF$_2$, FeS$_2$, Li$_2$O and at least one metal, LiF and at least one metal, In addition, second electrode 104 may comprise an organic, or polymeric electro-active material. Non-limiting examples include quinones such as di-methoxy benzoquinone, poly-anthraquinone, graphene, graphene oxide. As noted above, second electrode 104 can initially include most or all of the active material for first electrode 102. Similar to first electrode 102, second electrode 104 can optionally include getter material as described herein.

In accordance with exemplary embodiments of the disclosure, at least one of the first electrode 102 and the second electrode 104 include a metal, an alloy, or an intermetallic compound. In accordance with additional or alternative exemplary embodiments, at least one of the first electrode 102 and the second electrode 104 include a material configured to undergo an insertion reaction, an alloying, an intercalation, a disproportionation, a conversion reaction, or any combination thereof.

Separator 106 electrically isolates the first electrode from the second electrode and is permeable to at least one mobile species which is redox-active at least one of the first electrode and the second electrode. Exemplary materials suitable for separator 106 in accordance with embodiments of the disclosure include porous virgin or coated polyolefin, polypropylene, polyethylene, aramix fiber, and glass fiber. Separator 106 can optionally comprise the getter material in part or entirely as described herein.

Electrolyte 112 can be a fluid, e.g., a liquid or a gel electrolyte, which may also be in contact with solid ion conductors at least incorporated into the cell electrolyte in part (e.g., polymer, glass, ceramic). Electrolyte 112 generally includes a solvent and one or more salts. Electrolyte 112 can, in some cases, also include getter material as described herein.

A variety of non-aqueous (e.g., organic) solvents are suitable for use in the electrolyte 112. Non-aqueous solvents can be used alone or in any suitable combination. Whether a solvent comprises a single non-aqueous composition or a plurality of non-aqueous compositions, for the purposes of further exposition, the non-aqueous solvent will be referred to as "the solvent" in the singular. In order to provide for the reversible dissolution and plating of an electroactive metal, the solvent advantageously should provide appreciable solubility by coordination of the constituent inorganic salts of the electroactive metal. In accordance various examples, suitable solvents include non-aqueous polar aprotic solvents, ethers, organic carbonates, and tertiary amines, and may also include, lactones, ketones, glymes, nitriles, ionic liquids, aliphatic and aromatic hydrocarbon solvents and organic nitro solvents. More specifically, suitable solvents include THF, 2-methyl THF, dimethoxyethane, diglyme, triglyme, tetraglyme, diethoxyethane, diethylether, proglyme, ethyl diglyme, butyl diglyme, fluorinated ether, hydrofluoroethers, ethylene carbonate, fluoro-ethylene carbonate, dimethyl carbonate, ethyl methyl carbonate, diethyl carbonate, dimethylsulfoxide, dimethylsulfite, sulfolane, ethyl methyl sulfone, acetonitrile, hexane, toluene, fluoro-toluene, nitromethane, 1-3 dioxalane, 1-3 dioxane, 1-4 dioxane, trimethyl phosphate, tri-ethyl phosphate, hexa-methyl-phosphoramide (HMPA), N,N-propyl-methyl-pyrrolidinium-bis(trifluoromethylsulfonyl)imide (P13-TFSI), N,N-propyl-methyl-pyrrolidinium-diacetamide (P13-DCA), propyl-methyl-pyrrolidinium-bis(fluorosulfonyl)imide (P13-FSI), ethyl-dimethyl-propyl-ammonium-bis (trifluoromethylsulfonyl)imide (PDEA-TFSI), and 1-(methoxyethyl)-1-methylpiperidinium-bis(trifluoromethylsulfonyl)imide (MOEMPP-TFSI).

Exemplary salts for electrolyte 112 do not readily hydrolyze. For purposes of this disclosure, salts that do not readily hydrolyze are salts that do not react with trace amounts (e.g., <3000 ppm) water in a autocatalytic decomposition reaction to form significant amounts (e.g., more than 300 ppm) of strong acid such as HF or HCl. In accordance with further exemplary embodiments, the one or more salts do not comprise an anion selected from the group consisting of PF$_6^{-1}$, BF$_4^{-1}$, AlCl$_4^{-1}$, AsF$_6^{-1}$, ClO$_4^{-1}$, SiF$_6^{-1}$, or SbF$_6^{-1}$. Salts including such anions are thought to be susceptible to hydrolysis. By way of specific examples, the one or more salts do not include any of LiPF$_6$, LiBF$_4$, LiAlCl$_4$, LiAsF$_6$, LiClO$_4$, LiSiF$_6$, or LiSbF$_6$. Exemplary compounds suitable for the one or more salts comprise at least three elements and include two or more of the following: boron, phosphorous, fluorine, carbon, nitrogen, and oxygen. Non-limiting examples of exemplary salts of the disclosure include use of one or more salts comprise one or more anions selected from the group consisting of triflate (CF$_3$SO$_3^{-1}$), triflinate (CF$_3$SO$_2^{-1}$), perfluorobutanesulfonate (C$_4$F$_9$SO$_3^{-1}$), bis(perfluoroalkylsulfonyl)imide [N((C$_x$F$_{2x+1}$)$_x$SO$_2$)$_2^{-1}$], bis(trifluoromethane)sulfonimide [N(CF$_3$SO$_2$)$_2^{-1}$], bis(perfluoro ethylsulfonyl)imide [N(C$_2$F$_5$SO$_2$)$_2^{-1}$], (fluorosulfonyl)imide [N(SO$_2$F)$_2^{-1}$], bis(perfluoropinacolato)borate [B(C$_6$F$_{12}$O$_2$)$_2^{-1}$], bis(oxalato)borate [B(C$_2$O$_4$)$_2^{-1}$], difluoro(oxalato)borate [BF$_2$(C$_2$O$_4$)$^{-1}$], difluoro(malonato)borate [BF$_2$(C$_3$H$_2$O$_4$)$^{-1}$], bis(benzenesulfonyl)imide [N(C$_6$H$_5$SO$_2$)$_2^{-1}$], and bis(salicylato)borate [B(C$_7$H$_4$O$_3$)$_2^{-1}$]. The cation can be lithium, sodium, magnesium, or calcium. A concentration of the salt, or a combination of salts in the electrolyte solution ranges from about 0.01 M to about 10 M, about 0.1 M to about 7 M, or about 0.25 to about 7 M, or from about 0.5 M to saturation. Without wishing to be bound by theory, it is thought that the use of non-aqueous fluid electrolyte comprising salts that do not readily hydrolyze permits the function of the gas getter material(s), and may in fact even expedite the gettering activity of such materials, while in intimate contact with the non-aqueous fluid electrolyte.

First current collector 108 and/or second current collector 110 can include any material capable of sufficiently conducting electrons. Exemplary first/second electrode current collector 108/110 materials include aluminum, aluminum alloys, copper, copper alloys, nickel, nickel alloys, titanium, titanium alloys, steel, carbonaceous materials, and a metal substrate coated with an over-layer to prevent corrosion in the electrolyte.

As noted above, electrochemical cell 100 can include one or more layers 114, 116 of getter material. Layers 114 and/or 116 can be initially coated onto one or more surfaces of one or more of first electrode 102, second electrode 104 and/or separator 106. Generally, when electrochemical cell 100 includes layer 114 and/or layer 116, the layer(s) will be between an electrode 102 or 104 (first or second) and separator 106.

Figure 2:
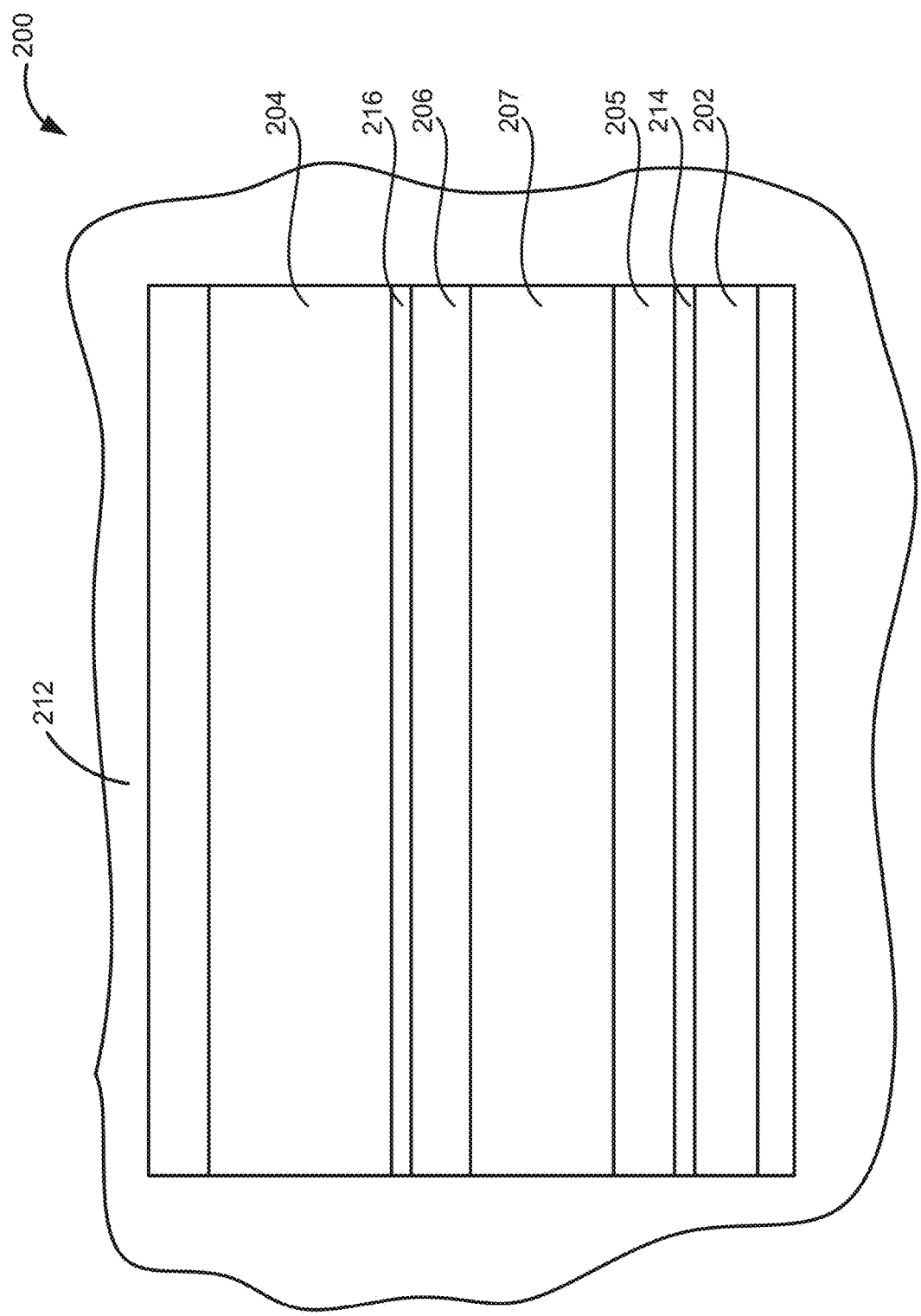
FIG. 2 illustrates another electrochemical cell in accordance with at least one exemplary embodiment of the disclosure.

FIG. 2 illustrates another electrochemical cell 200 in accordance with additional embodiments of the disclosure. Electrochemical cell 200 is similar to electrochemical cell 100, except electrochemical cell 200 includes a gate electrode 207, in addition to the other cell components. When an electrochemical cell includes a gate electrode, a circuit can be configured to measure an operating parameter of the device and to determine when a cell health event occurs and/or respond to the cell health event, as disclosed in U.S. Patent Publication No. 2016/0006081 in the name of Eaglesham et al., the contents of which are incorporated herein by reference, to the extent such contents do not conflict with the present disclosure.

In the illustrated example, electrochemical cell 200 includes a first electrode (e.g., a negative electrode) 202, a second electrode (e.g., a positive electrode) 204, a first separator 205, a second separator 206, a gate electrode 207 between first electrode 202 and second electrode 204 and between first separator 205 and second separator 206, an electrolyte 212, and optionally includes one or more layers (e.g., coatings) 214, 216 including getter material. Electrochemical cell 200 can optionally include getter material incorporated into one or more of first electrode 202, second electrode 204, first separator 205, second separator 206 and/or electrolyte 212.

First electrode 202, second electrode 204, first separator 205, second separator 206, electrolyte 212, and one or more layers 214, 216 can be the same or similar to the respective components discussed above in connection with FIG. 1.

Gate electrode 207 is in electrochemical communication with electrolyte 212 and permeable to at least one mobile species that is redox-active to at least one of first electrode 202 and second electrode 204. In the illustrated example, at least one gate electrode 207 is situated between the first electrode 202 and second electrode 204. By way of examples, gate electrode 207 can include a selected one of an electronically conducting material as freestanding form and an electronically conductive film deposited upon an insulating substrate having porosity and tortuosity. Gate electrode 207 can be connected to external circuit through a dedicated tab. Other electrochemical cells with gate electrode 207 are disclosed in U.S. Patent Publication No. 2016/0006081 in the name of Eaglesham et al.

Batteries

A battery can include one or more electrochemical cells, such as electrochemical cell 100 or electrochemical cell 200. The battery can be a button or coin cell battery comprising discs of electrochemical cell components (electrode and separator) that sit in a can base onto which a can lid is crimped. In other embodiments, the battery is a stacked cell battery. In other embodiments, the battery is a prismatic or pouch cell comprising one or more stacked electrochemical cells sandwiched between current collectors.

Figure 3:
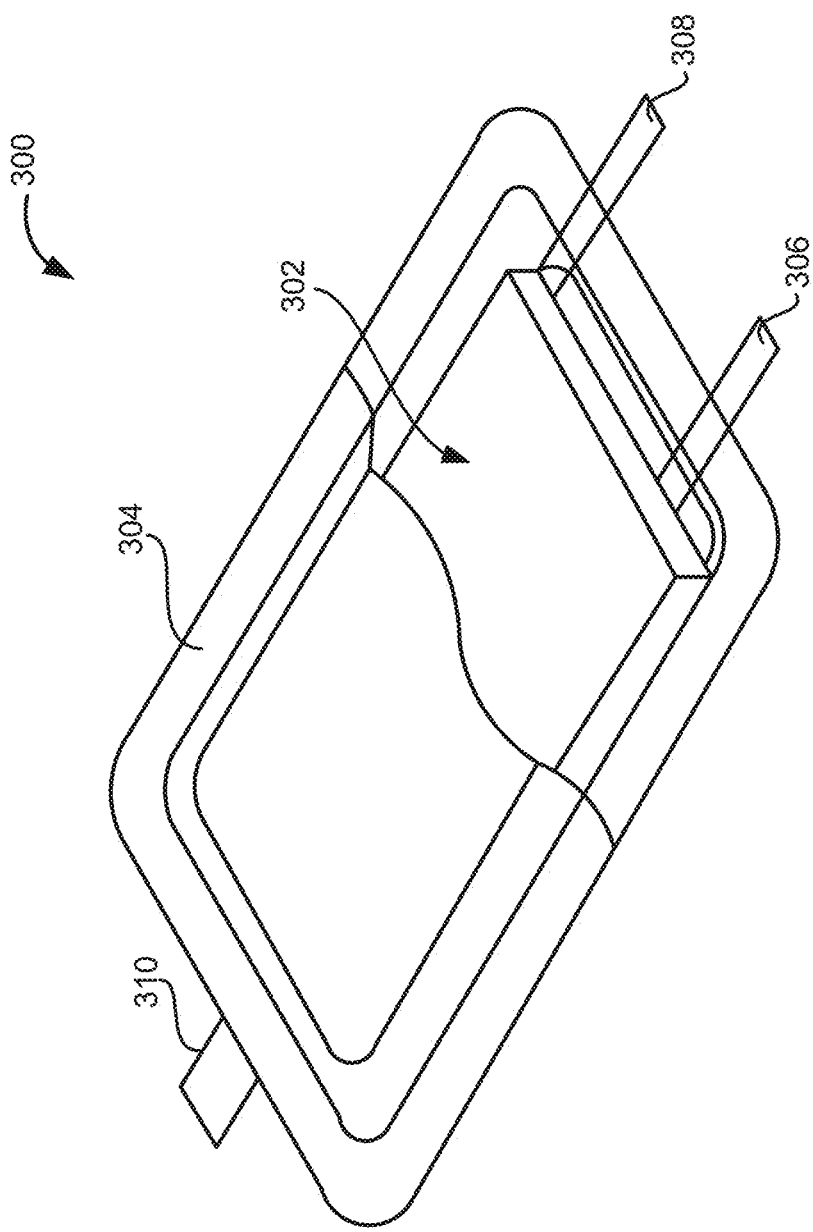
FIG. 3 illustrates a battery in accordance with at least one exemplary embodiment of the disclosure.

FIG. 3 illustrates an exemplary soft pack cell laminate battery 300 that includes an electrochemical cell 302, which can be the same or similar to electrochemical cell 100 or electrochemical cell 200, and first and second tabs 306 and 308. First tab 306 can form contact to a first electrode (e.g., first electrode 102/202); second tab can form contact to a second electrode (e.g., second electrode 104/204). Battery 300 can optionally include one or more third tabs 310 that are electrically coupled to a gate electrode, if present. Electrochemical cell 302 can include a folded electrochemical cell (e.g., cell 100/200), which can be within a (e.g., polymer coated aluminum foil) pouch 304. Pouch 304 can be vacuum and heat dried, filled with electrolyte (e.g., electrolyte 112, 212), and vacuum and heat sealed. In other embodiments, the battery is a prismatic or pouch bi-cell comprising one or more stacks of a positive electrode that is coated with active material on both sides and wrapped in porous separator, and a negative electrode folded around the positive electrode, wherein one or both current collectors can comprise carbonaceous materials. These electrochemical cells can be folded within a (e.g., polymer coated aluminum foil) pouch, dried under heat and/or vacuum, filled with electrolyte, and vacuum and heat sealed. Getter material can be added to the battery as described below. In accordance with some embodiments, the prismatic or pouch cells include an additional tab composed of a metal foil or carbonaceous material of the same kind as current collectors described herein. Tab 306, 308 and/or additional tab 310 can be affixed to the current collector by laser or ultrasonic welding, adhesive, or mechanical contact, in order to connect the electrodes to the device outside the packaging.

In accordance with yet additional embodiments, the battery is a wound or cylindrical cell comprising one or more electrochemical cells as described herein. In this case, the battery can include wound layers of one or more stacks of a positive electrode which comprises active material coated upon an electronically conducting substrate, sandwiched between layers of porous separator, and a negative electrode comprising active material coated upon an electronically conducting substrate. The stack(s) can be wound into cylindrical roll, inserted into the can, dried under heat and/or vacuum, filled with electrolyte, and vacuum and welded shut. Getter material can be added to the battery as described below. In some embodiments of the cylindrical cells described herein, an additional tab composed of a metal foil or conducting material of the same kind as current collectors described herein, is affixed to the current collector by laser or ultrasonic welding, adhesive, or mechanical contact, in order to connect the electrodes to an external circuit outside the packaging.

In accordance with additional embodiments of the disclosure, a method of forming an electrochemical cell includes forming a structure comprising a first electrode, a second electrode, and a separator there between, wherein the electrochemical structure includes one or more getters as described herein. As noted above, one or more components (e.g., first electrode, second electrode, separator and/or electrolyte) can include getter material and/or getter material can be coated on or layered over one or more of the electrochemical cell components.

In accordance with some embodiments of the disclosure, a method of forming an electrochemical cell includes providing a mixture of getter material and a liquid (e.g., water, alcohol, ester, ketone, ether, lactam, amide, nitrile, methanol, ethanol, isopropanol, carbonate, ethyl methyl carbonate, dimethyl carbonate, tetrahydrofuran, 1,2-dimethoxy ethane, acetone, N-methyl-2-pyrrolidone, and acetonitrile)

employed to introduce the getter material as a mixture, solution, or suspension to the structure, wherein the getter material directly contacts one or more of the first electrode, the second electrode, and the separator, removing at least a portion of the liquid, and after removing at least a portion of the liquid, adding an electrolyte solution to the structure. A battery can be formed by forming and/or sealing a casing around the electrochemical cell.

EXAMPLES

The following non-limiting examples illustrate comparative electrochemical cells and electrochemical cells in accordance with exemplary embodiments of the disclosure. These examples are merely illustrative, and it is not intended that the invention be limited to the examples.

In the following examples and the comparative example, lithium-ion electrochemical cells were prepared by the following steps:

Example 1

Figure 4:
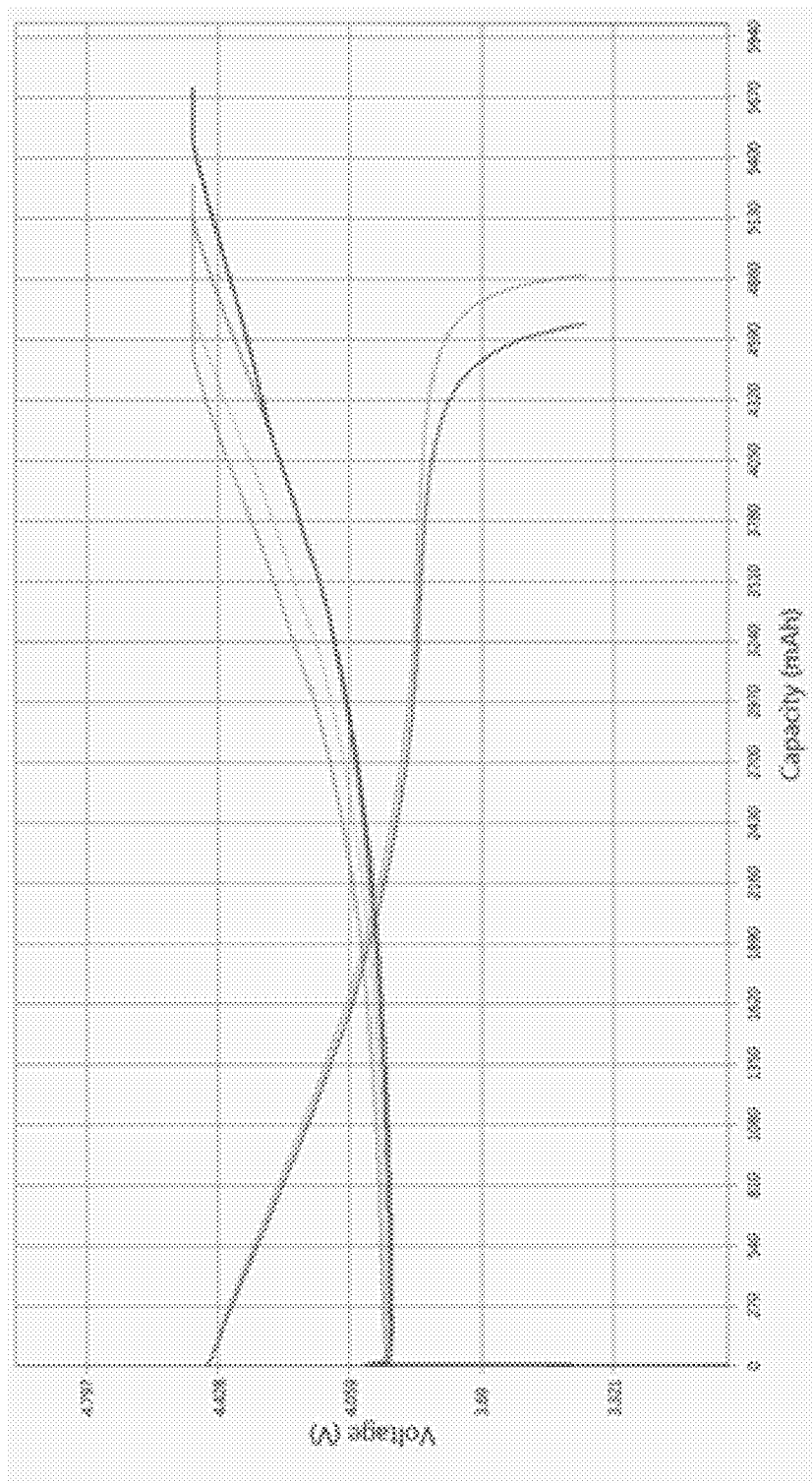
FIG. 4 illustrates a typical voltage profile for a cell containing a getter in intimate contact with an electrode assembly and a non-aqueous electrolyte (darker line) as compared to the same cell construction without the getter (lighter line).

Electrochemical cells comprising a lithium cobalt oxide "LCO" positive electrode, a polyolefin separator, and a negative electrode of lithium metal electrochemically plated upon a copper substrate were constructed by winding the three components in a manner to form a flat wound, prismatic stack with a nominal capacity of about 5.0 Ah. Subsequently the stack was sealed a soft-pouch laminate material after being charged with an electrolyte comprising at least in part ethylene carbonate, dimethyl carbonate, and lithium difluoro(oxalato)borate, a salt that does not readily hydrolyze. One cell includes a getter comprising a mixture of $Li_2O$ and LiOH deposited in intimate contact with the electrode assembly and electrolyte. FIG. 4 illustrates a typical voltage profile for a cell containing a getter in intimate contact with an electrode assembly and a non-aqueous electrolyte (darker line) as compared to the same cell construction without the getter (lighter line). The cells depicted are first charged at a rate of 0.2 C to greater than 4.25 V, then discharged at a rate of 0.2 C. Subsequently they are re-charged at a higher rate of 0.33 C to greater than 4.25 V. It is apparent by way of comparing the shape of the voltage profile and corresponding capacity that there is no additional electrochemical activity due to the presence of the getter in intimate contact with the electrode assembly and electrolyte.

Example 2

Figure 5:
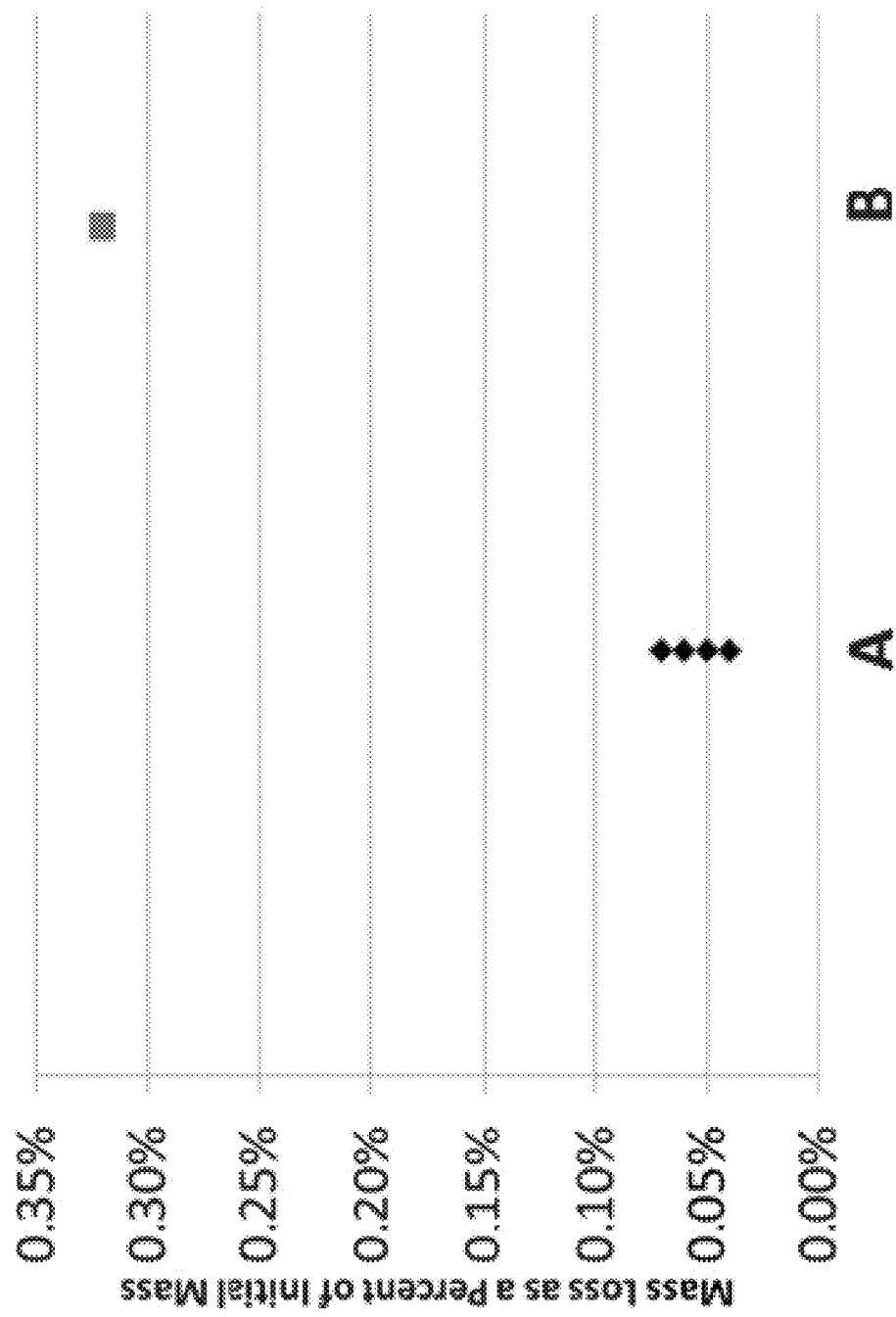
FIG. 5 illustrates the mass loss for a set of 4.5 Ah cells containing a getter in intimate contact with the electrode assembly and non-aqueous electrolyte (A) as compared to the same cell construction without the getter (B).

A series of cells were constructed in similar fashion as described in Example 1 presented herein. The cells, some comprising getter and some excluding getter, are charged to greater than 4.25 V and 4.5 Ah, then subjected to ambient humidity and a temperature of nearly 80° C. for greater than 50 hours. FIG. 5 illustrates the mass loss associated with gas evolution, and leakage from cells. Data for "A" in FIG. 5 depicts negligible mass loss and corresponds to cells comprising a getter in intimate contact with the electrode assembly and non-aqueous electrolyte. Data for "B" in FIG. 5 is for the same cell construction without the getter, and depicts seven times higher mass loss under the same thermal conditions.

Example 3

Figure 6:
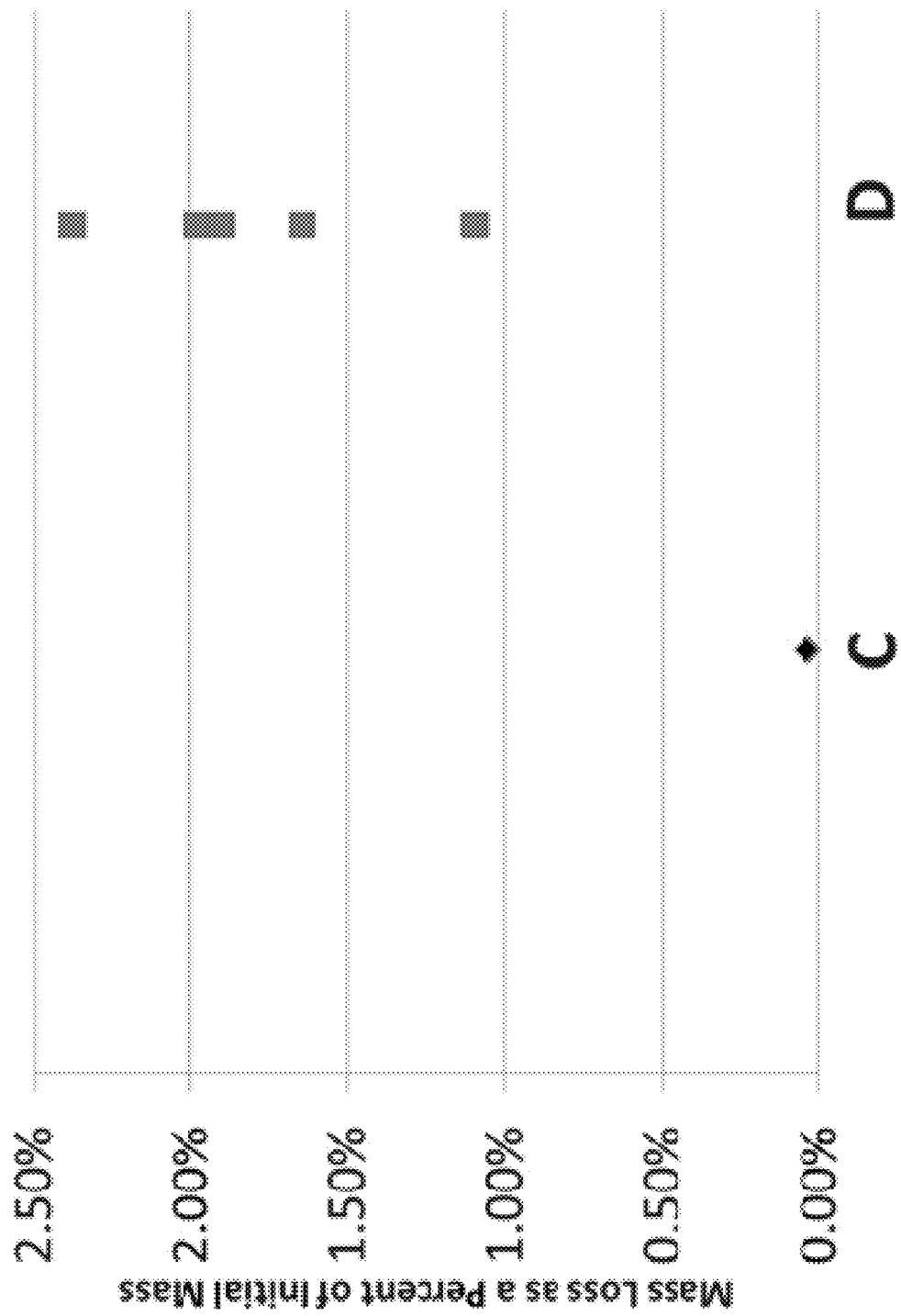
FIG. 6 illustrates the mass loss for 5 Ah cells containing a getter in intimate contact with an electrode assembly and non-aqueous electrolyte (C) as compared to the same cell construction without the getter (D).

A series of cells were constructed in similar fashion, but with a lithium nickel manganese oxide cathode as described in Example 1 presented herein. The cells, some comprising getter and some excluding getter, are charged to greater than 4.25 V and 5.0 Ah, then subjected to ambient humidity and a temperature of nearly 80° C. for different periods of time. FIG. 6 illustrates the mass loss associated with gas evolution, and leakage from cells. Data for "C" in FIG. 6 depicts negligible mass loss after 60 hours at temperature of nearly 80° C. and corresponds to cells comprising a getter comprising a 3:1 mixture of LiOH and $Li_2O$ in intimate contact with the electrode assembly and non-aqueous electrolyte. Data for "D" in FIG. 6 is for the same cell construction without the getter, and depicts a few percent mass loss due to a high rate of gas evolution and leakage after only 18 hours at temperature of nearly 80° C.

Example 4

Figure 7:
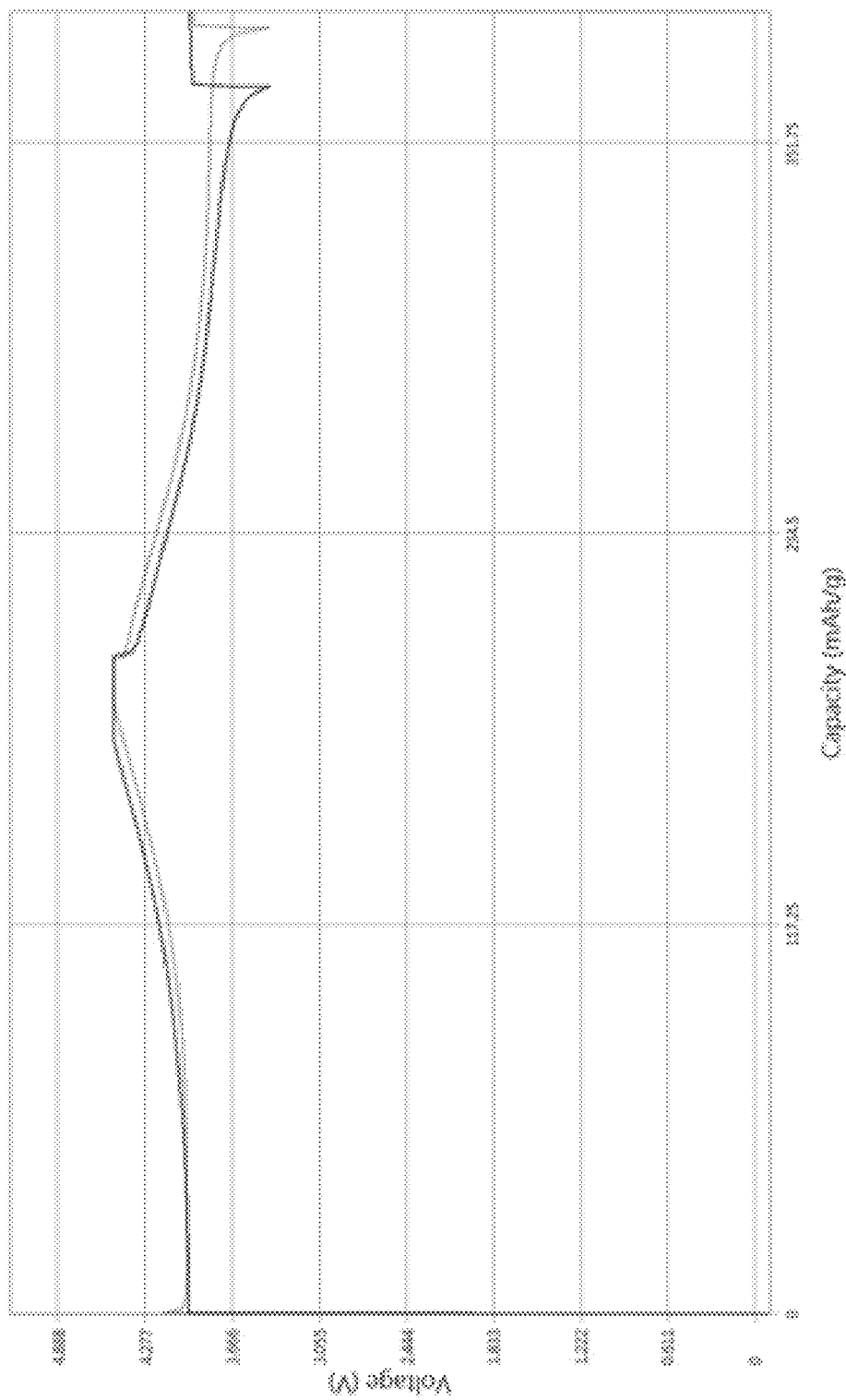
FIG. 7 illustrates a typical voltage profile for a cell containing a getter coated upon an electrode surface in intimate contact with non-aqueous electrolyte (darker line) as compared to the same cell construction without the getter (lighter line).

A positive electrode was prepared by coating a formulation of lithium cobalt oxide, carbon, and polymeric binder from solution of N-methyl pyrrolidinone upon an aluminum substrate. Subsequently a composite getter comprising LiOH and carbon was spray coated upon the positive electrode from a solution of methanol. The methanol is subsequently removed. Electrochemical cells comprising a positive electrode coated with LiOH and carbon composite getter, a polyolefin separator, and a negative electrode of lithium metal electrochemically plated upon a copper substrate were constructed by stacking. Subsequently the stack was sealed a soft-pouch laminate material after being charged with an electrolyte comprising at least one non-aqueous solvent and salt that does not readily hydrolyze. FIG. 7 illustrates a typical voltage profile for a cell comprising a getter in intimate contact with an electrode assembly (i.e., coated upon the positive electrode and therefore situated in the stack between the positive electrode and separator) and a non-aqueous electrolyte (darker line) as compared to the same positive electrode without the getter coating in the cell construction (lighter line). The cells depicted are charged at a rate of 1 C to greater than 4.25 V, then discharged at a rate of 1 C in this cycling scheme. It is apparent by way of comparing the shape of the voltage profile and corresponding capacity that there is no deleterious electrochemical activity due to the presence of the getter in intimate contact with the electrode assembly and electrolyte.

Although exemplary embodiments of the present disclosure are set forth herein, it should be appreciated that the disclosure is not so limited. For example, although the systems and methods are described in connection with various specific chemistries, the disclosure is not necessarily limited to these chemistries. Various modifications, variations, and enhancements of the systems and methods set forth herein can be made without departing from the spirit and scope of the present disclosure.

What is claimed is:
1. An electrochemical device, comprising:
a first electrode and a second electrode;
a separator interposed between the first electrode and the second electrode;
a non-aqueous fluid electrolyte in contact with the separator, the first electrode, and the second electrode;
a composite getter including one or more first gas getter materials dispersed in the non-aqueous fluid electrolyte and deployed to adsorb one or more gases that the electrochemical device produces during operational cycling of the electrochemical device; and one or more second gas getter materials,
wherein the non-aqueous fluid electrolyte comprises one or more non-aqueous solvents and one or more salts that do not readily hydrolyze in the one or more non-aqueous solvents; and
wherein the one or more second gas getter materials are in direct contact with, separate and apart from the non-aqueous fluid electrolyte, one or more of the first electrode, the second electrode, and the separator, wherein the one or more second gas getter materials are deployed to adsorb one or more gases that the electrochemical device produces during operational cycling of the electrochemical device.

2. The electrochemical device of claim 1, wherein the one or more first gas getter materials or the one or more second gas getter materials, or both, comprise a metal oxide and a metal hydroxide.

3. The electrochemical device of claim 1, wherein the one or more salts do not comprise an anion selected from the group consisting of $PF_6^{-1}$, $BF_4^{-1}$, $AlCl_4^{-1}$, $AsF_6^{-1}$, $ClO_4^{-1}$, $SiF_6^{-1}$, or $SbF_6^{-1}$.

4. The electrochemical device of claim 1, wherein the one or more salts do not comprise any of $LiPF_6$, $LiBF_4$, $LiAlCl_4$, $LiAsF_6$, $LiClO_4$, $LiSiF_6$, or $LiSbF_6$.

5. The electrochemical device of claim 1, wherein the non-aqueous fluid comprises one or more salts of at least one of the following anions: triflate ($CF_3SO_3^{-1}$), triflinate ($CF_3SO_2^{-1}$), perfluorobutanesulfonate ($C_4F_9SO_3^{-1}$), bis(perfluoroalkylsulfonyl)imide $[N((C_xF_{2x+1})_xSO_2)_2^{-1}]$, bis(trifluoromethane) sulfonimide $[N(CF_3SO_2)_2^{-1}]$, bis(perfluoroethylsulfonyl)imide $[N(C_2F_5SO_2)_2^{-1}]$, bis(fluorosulfonyl)imide $[N(SO_2F)_2^{-1}]$, bis(perfluoropinacolato)borate $[B(C_6F_{12}O_2)_2^{-1}]$, bis(oxalato)borate $[B(C_2O_4)_2^{-1}]$, difluoro(oxalato)borate $[BF_2(C_2O_4)^{-1}]$, difluoro(malonato)borate $[BF_2(C_3H_2O_4)^{-1}]$, bis(benzenesulfonyl)imide $[N(C_6H_5SO_2)_2^{-1}]$, and bis(salicylato)borate $[B(C_7H_4O_3)_2^{-1}]$.

6. The electrochemical device of claim 1, wherein the one or more first gas getter materials or the one or more second gas getter materials, or both, comprise one or more compounds selected from the group consisting of: LiOH, $Li_2O$, NaOH, $Na_2O$, KOH, $K_2O$, $Mg(OH)_2$, MgO, $Ca(OH)_2$, and CaO, in any combination.

7. The electrochemical device of claim 1, wherein a concentration of the salt, or a combination of the one or more salts in the non-aqueous fluid ranges from about 0.01 M to about 10 M.

8. The electrochemical device of claim 1, wherein the first gas getter materials or the second gas getter materials, or both, comprise one or more of carbon, polymer, resin, metal, or ceramic.

9. The electrochemical device of claim 8, wherein all of the one or more first and second gas getter materials do not comprise any of a silica gel, an alumina, or a zeolite.

10. The electrochemical device of claim 1, wherein the electrochemical device is a battery comprising one or more electrochemical cells.

11. The electrochemical device of claim 1, wherein the non-aqueous fluid comprises at least one solvent that is a non-aqueous polar aprotic solvent.

12. The electrochemical device of claim 1, wherein the non-aqueous fluid comprises at least one solvent including: ethers, organic carbonates, tertiary amines, lactones, ketones, glymes, nitriles, ionic liquids, aliphatic and aromatic hydrocarbon solvents, and organic nitro solvents.

13. The electrochemical device of claim 1, wherein the non-aqueous fluid comprises at least one solvent including THF, 2-methyl THF, dimethoxyethane, diglyme, triglyme, tetraglyme, diethoxyethane, diethylether, proglyme, ethyl diglyme, butyl diglyme, fluorinated ether, hydrofluoroethers, ethylene carbonate, fluoro-ethylene carbonate, dimethyl carbonate, ethyl methyl carbonate, diethyl carbonate, dimethylsulfoxide, dimethylsulfite, sulfolane, ethyl methyl sulfone, acetonitrile, hexane, toluene, fluoro-toluene, nitromethane, 1-3 dioxalane, 1-3 dioxane, 1-4 dioxane, trimethyl phosphate, tri-ethyl phosphate, hexa-methyl-phosphoramide (HMPA), N,N-propyl-methyl-pyrrolidinium-bis(trifluoromethylsulfonyl)imide (P13-TF SI), N,N-propyl-methyl-pyrrolidinium-diacetamide (P13-DCA), propyl-methyl-pyrrolidinium-bis(fluorosulfonyl)imide (P13-FSI), ethyl-dimethyl-propyl-ammonium-bis(trifluoromethylsulfonyl)imide (PDEA-TFSI), and 1-(methoxyethyl)-1-methylpiperidinium-bis(trifluoromethylsulfonyl)imide (MOEMPP-TF SI).

14. The electrochemical device of claim 1, wherein the gas being gettered comprises at least one of $CO_2$, CO, $H_2S$, $NO_2$, $SO_2$, $H_2O$, $H_2$, $O_2$, $C_2H_4$, $C_3H_6$, $C_xH_{4*x}$, and hydrocarbons.

15. The electrochemical device of claim 1, wherein the one or more salts that do not readily hydrolyze comprises one or more of the following cations: lithium, sodium, magnesium, or calcium.

16. The electrochemical device of claim 1, wherein the one or more second gas getter materials are in direct contact with both the separator and at least one of the first electrode and the second electrode.

17. The electrochemical device of claim 1, wherein the one or more second gas getter materials are in direct contact with at least the first electrode and the second electrode.

18. The electrochemical device of claim 1, further comprising packaging material, wherein the one or more second gas getter materials are incorporated in a coating that is applied to the packaging material.

19. The electrochemical device of claim 1, wherein the one or more second gas getter materials are in direct contact with each of the first electrode, the second electrode, and the separator by application of the one or more second gas getter materials thereto after assembling the first electrode, the second electrode, and the separator with one another prior to adding of the non-aqueous fluid electrolyte to the electrochemical device.

20. An electrochemical device, comprising:
a first electrode and a second electrode;
a separator interposed between the first electrode and the second electrode;
a non-aqueous fluid electrolyte in contact with the separator, the first electrode, and the second electrode; and
a composite getter including one or more first gas getter materials dispersed in the non-aqueous fluid electrolyte and deployed to adsorb one or more gases that the electrochemical device produces during operational cycling of the electrochemical device,
wherein the non-aqueous fluid electrolyte comprises one or more non-aqueous solvents and one or more salts that do not readily hydrolyze in the one or more non-aqueous solvents,
wherein the one or more gas getter materials comprise one or more compounds selected from the group consisting of: LiOH, $Li_2O$, NaOH, $Na_2O$, KOH, $K_2O$, $Mg(OH)_2$, $Ca(OH)_2$, and CaO, in any combination, and
wherein the electrochemical device includes packaging material and one or more second gas getter materials separate and apart from the one or more first gas getter materials, wherein the one or more second gas getter materials are incorporated into a coating applied to the packaging material.

\* \* \* \* \*